May 14, 1963 D. D. CHAPMAN ETAL 3,089,230
PROCESS FOR SEPARATING INDIVIDUAL METALLIC
LAYERS OF A HOLLOW MULTILAYERED OBJECT
Filed Feb. 4, 1960

DONALD D. CHAPMAN
JAMES P. SWED
*INVENTORS*

BY Ernest H. Beck 3,089,230
PROCESS FOR SEPARATING INDIVIDUAL METAL-
LIC LAYERS OF A HOLLOW MULTILAYERED
OBJECT
Donald D. Chapman, Wilmington, Del., and James P.
Swed, Gibbstown, N.J., assignors to E. I. du Pont de
Nemours and Company, Wilmington, Del., a corporation of Delaware
Filed Feb. 4, 1960, Ser. No. 6,667
3 Claims. (Cl. 29—403)

The present invention relates to a process for separating metal layers. More specifically, the invention involves an easily practiced method of separating the individual layers of a mechanically-bonded multilayered metal assembly.

Frequently in metal working operations, the surface of a relatively inexpensive metal is protected by a layer of more costly metal which possesses certain desirable characteristics not provided by the less expensive base metal. For example, in certain chemical processes wherein highly corrosive substances are employed, the reactors, pipe lines, storage tanks, and so forth usually are constructed of a relatively inexpensive base metal such as low-carbon steel or brass which is protected by a layer of chromium, nickel, stainless steel, or other corrosion-resistant metal or alloy. Two primary advantages to the use of such materials in the aforementioned application exist. First, a considerable economic saving results when only a thin layer of the more costly material is required as opposed to the cost of constructing large pieces of apparatus from the single metal. Naturally, this saving is multiplied many times when apparatus of large capacity, as would be required for a plant scale operation, is to be constructed. Secondly, the metals possessing the required resistance to corrosion often are lacking in other required physical properties such as tensile strength, compressive strength, structural strength, and thermal shock resistance. This second advantage then becomes a serious consideration for processes in which the reactants are to be under an appreciable amount of pressure. Consequently, in recent years the use of multilayered metal assemblies in chemical process equipment has become quite widespread.

Other applications for such assemblies include heat exchangers, jet engine parts, cooking utensils, X-ray equipment, electrical devices, and decorative trim for automobiles and buildings. However, this invention is not intended primarily to be applied to very small or permanent fixtures, but rather to large multilayered metal objects which have become obsolete or unusable.

Owing to the constant progress being made in technological areas, many chemical processes or phases thereof rapidly become obsolete. Consequently, changes are being made continually in processing techniques and equipment, and, as a result, certain pieces of expensive, specially designed, multilayered processing equipment fall into disuse as they are completely valueless for other applications. Often, such equipment is sold as scrap at only a fraction of the actual value of the metal contained therein, as heretofore no means have existed for efficiently separating the metal layers joined together to form the assembly. Although chiseling, sawing, or grinding have been employed to a limited extent, particularly where very valuable metals such as gold or platinum are involved, such procedures are inefficient, tedious and time-consuming, and often are completely unsuitable.

Accordingly, it is an object of this invention to satisfy the need for a method for separating the individual metal layers of a multilayered assembly. A further object is to provide a method for recovering the individual metals or alloys from the layers comprising a multilayered body which is efficient, effective, and easily practiced. As the invention is described, other objects will become apparent.

We have found that for the case of multilayered tubes the foregoing objects are achieved when we position the tube on a firm supporting means, attach a strip of a detonating explosive on the outer surface of the tube extending in a direction parallel to the axis of the tube and in a position approximately 180° from the point of contact of the tube with the supporting medium and initiate the explosive. For the case of a hollow hemisphere, optimum results are achieved when the hemisphere is positioned, open end down and supported as described above, and the strips of explosive are placed on the outer surface extending in radial fashion from the apex of the hemisphere to the base thereof. Multilayered objects having other configurations, either symmetrical or non-symmetrical, may be treated according to the invention, and obviously the manner in which the explosive strips are arranged will be dependent on the configuration.

The following figures and examples serve to provide a more complete understanding of the nature of this invention. However, they are not to be considered as limiting the invention in any fashion.

Figure 1:
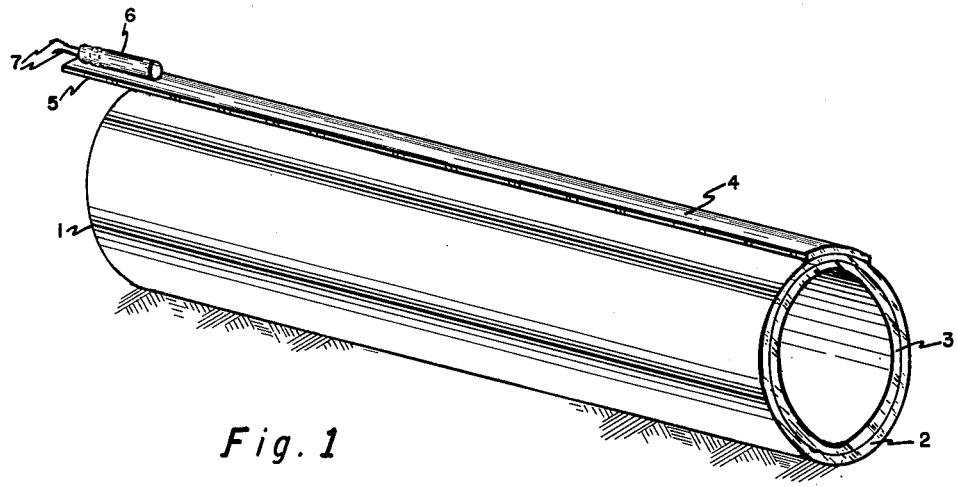
FIGURE 1 shows a tube composed of an inner and outer layer with the explosive strip positioned according to the invention.
Figure 2:
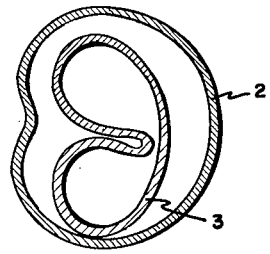
FIGURE 2 is a cross-sectional representation of the cylinder of FIGURE 1 after the explosive separation of the layers.
Figure 3:
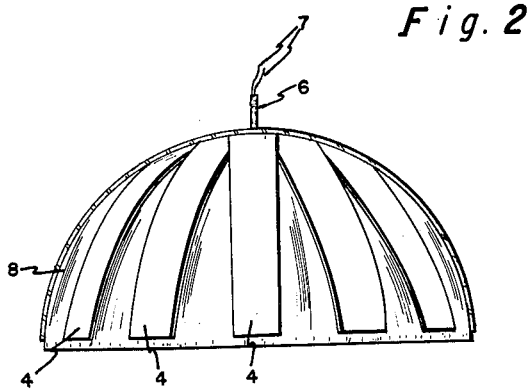
FIGURE 3 represents a hollow hemisphere which is composed of two layers with explosive strips extending radially from the apex thereof.

In FIGURE 1, 1 represents a two-layered tube which is positioned directly on the ground. The base metal is indicated by 2, and 3 represents the protecting layer. 4 is a thin strip of a detonating explosive having attached on an extended portion 5 a conventional electric detonator 6 from which extend lead wires 7. In FIGURE 2, the inner layer of metal 3 has been collapsed away from the base metal 2. In FIGURE 3, hollow hemisphere 8 of multilayered material has attached to its surface radial strips 4 of explosive, and an initiator 6 having lead wires 7 is attached at their intersection which is the apex of the hemisphere.

*Example 1*

In the following example the detonating explosive consisted of a blend of 85 parts of PETN, 7.5 parts of butyl rubber, and 7.5 parts of a thermoplastic terpene resin, rolled into sheets, which were then cut into strips of the desired size. The composition had a velocity of detonation of about 7200 meters per second, and the strips were strong, flexible, and non-resilient.

A length of curved tubing, cut from a coil of tubing of 7 feet diameter, and composed of stainless steel internally protected by an alloy of copper and nickel was placed directly on the ground. The stainless steel layer and the copper-nickel layer were each 0.1 inch thick and the outer diameter of the tubing was 2.2 inches. To the top surface of the tube was glued a strip of the described explosive, ½ inch wide by 0.160 inch thick and 50 inches long, said length required in order to provide a portion which extended beyond the tube. A commercial electric initiator was attached to this extended portion of the explosive strip. The explosive loading was 4 grams per square inch of surface covered, the total weight of the explosive composition being 114 grams. Upon actuation of the initiator and detonation of the explosive charge, the tubing was not displaced from its original position on the ground, and the outside configuration of the tubing was changed only slightly. However, the inner layer was completely and cleanly separated from the outer layer, this layer being deformed more substantially from its original circular cross-sectional configuration. The inner layer was collapsed to an extent such that the opposite walls of the inner layer almost touched each other. The inner layer was easily removed from the outer stainless steel layer and was completely free of any contamination by the stainless steel.

*Example 2*

A ½-inch-wide strip of the explosive of Example 1 was positioned on the outer surface of a 3-foot-long aluminum tube of outer diameter 3.490 inches and containing a steel tube as the inner layer according to the method described in Example 1. The thickness of the aluminum layer was 0.216 inch and of the steel layer 0.067 inch. Detonation of the explosive resulted in cutting through the aluminum layer and substantial inward deformation of the inner layer. As in the preceding example, separation of the layers was accomplished with no difficulty.

*Example 3*

An aluminum tube 1.250 inches in diameter and having a copper tube as the inner protective layer was treated in the manner described above. The aluminum and copper layers were 0.045 inch and 0.062 inch in thickness, respectively. An explosive cord ¼ inch in diameter and composed of PETN in a plastic nitrocellulose matrix was used in place of the explosive strips of the foregoing examples. Again upon the detonation of the explosive, the layers were cleanly separated, the inner layer being easily removed from the outer layer.

The detonating explosive used for the separation operation in accordance with the invention is not critical. It will however, owing to the small quantity of explosive required, be one which is capable of propagating a detonation reliably when only small quantities are present, i.e., it will propagate reliably in loadings as low as 1 gram per square inch. The selection of the amount of explosive to be employed will depend on the nature of the explosive, the thickness of the layers to be separated, the physical properties of the metals themselves, particularly their tensile strengths, the nature of the bond between the layers, and to a degree, the cross-sectional area of the object. Although I do not intend to be limited by theoretical considerations, the explosive energy in all cases will be at least sufficient to provide a reflected shock at the interface between the layers which will supply a tension adequate to separate the layers and to permanently deform the inner layer. The maximum amount of explosive will not in any case be sufficient to swage the outer layer onto the collapsed inner layer; that is, the residual energy in the outer metal layer after the inner layer has been collapsed by the reflected wave should not be sufficient to collapse the outer layer to the same degree as the inner layer. The explosive should have a velocity of detonation of at least 1500 meters per second.

As the firm supporting means, in most cases the ground will serve quite efficiently; however, auxiliary supporting means may occasionally be employed with benefit. In order to provide the reflected shock wave required to separate the layers, the medium which surrounds the object being treated will have a higher sonic impedance than do the metals which comprise the layers. Air will usually be satisfactory for this purpose.

When only a portion of an assembly is to be removed for the separation treatment, the removal will be desirably accomplished by the use of an abrasive wheel or saw. Although it is possible to treat an object which has been removed by using a welding or cutting torch, such action, if not very carefully done, may increase the degree of bonding between the layers, and thus make efficient and clean separation more difficult. We also prefer to glue or otherwise adhesively attach the explosive strip to the surface of the metal in order to insure against displacement of the explosive from the surface of the metal before detonation. Further, when pipe from coils is to be treated, the pipe will preferably be cut in lengths not greater than one-third of the circumference of the coil.

Although only separations of layers in bodies of hemispherical and cylindrical configuration have been shown, it is to be understood that the novel process is by no means limited to these configurations; conical, rectangular, and irregular bodies composed of two or more mechanically bonded layers also are adaptable to the separation process. Having fully described the invention in the foregoing, we intend only to be limited by the following claims.

We claim:

1. A process for separating individual metallic layers of a hollow multilayered object wherein the surface of one metal is protected by at least one mechanically bonded layer of a different metal which comprises positioning said multilayered object on a supporting means, the interior of said object being open to the atmosphere, attaching a length of a detonating explosive composition to the outer surface of said object opposite the support means, said charge of explosive being sufficient to provide a reflected shock wave at the interface between the layers adequate to tension the outer layer and permanently deform the inner layer to a degree greater than the outer layer and thereby separate said layers, attaching initiating means to the said explosive composition, and thereafter causing actuation of the initiating means whereby the explosive composition is detonated and the inner layer is deformed away from the outer layer sufficiently to readily allow disassembly of the inner layer from the outer layer.

2. A process according to claim 1, wherein said multilayered object is of tubular configuration.

3. A process according to claim 1, wherein said explosive composition comprises PETN.

References Cited in the file of this patent

UNITED STATES PATENTS

| | | |
|---|---|---|
| 2,305,261 | Kinley | Dec. 15, 1942 |
| 2,429,967 | Sorensen | Oct. 28, 1947 |
| 2,745,345 | Sweetman | May 15, 1956 |

OTHER REFERENCES

Steel, page 85, column 3, Aug. 25, 1958.